US006646094B1

(12) United States Patent
Malhotra et al.

(10) Patent No.: US 6,646,094 B1
(45) Date of Patent: Nov. 11, 2003

(54) LOW EMISSION FORMALDEHYDE RESIN AND BINDER FOR MINERAL FIBER INSULATION

(75) Inventors: Vinay Malhotra, Louisville, KY (US); Wayne Walliser, Fort Knobs, IN (US); Susan G. Watson, Fort Knobs, IN (US); Pierre C. Herault, North Wales, PA (US); Domenic Tessari, Berwyn, PA (US); Philippe Espiard, Gouvieux (FR); Serge Tetart, Saint Maximin (FR); Bruno Malhieuxe, Beuvry (FR)

(73) Assignees: CertainTeed Corporation, Valley Forge, PA (US); Borden Chemical, Inc., Columbus, OH (US)

( * ) Notice: Subject to any disclaimer, the term of this patent is extended or adjusted under 35 U.S.C. 154(b) by 121 days.

(21) Appl. No.: 10/018,707

(22) PCT Filed: Jun. 16, 2000

(86) PCT No.: PCT/US00/16754

§ 371 (c)(1),
(2), (4) Date: Dec. 17, 2001

(87) PCT Pub. No.: WO00/78834

PCT Pub. Date: Dec. 28, 2000

Related U.S. Application Data

(60) Provisional application No. 60/129,615, filed on Jun. 17, 1999, and provisional application No. 60/141,294, filed on Jun. 26, 1999.

(51) Int. Cl.⁷ ............... C08G 14/04; C08G 14/08

(52) U.S. Cl. ............... 528/129; 528/137; 528/140; 528/145; 528/162; 528/164; 528/230; 528/239; 528/256; 528/257; 528/489; 528/492; 528/503; 524/841

(58) Field of Search ............... 528/129, 137, 528/140, 145, 162, 164, 230, 239, 256, 257, 489, 492, 503; 524/841

(56) References Cited

U.S. PATENT DOCUMENTS

| | | |
|---|---|---|
| 4,663,419 A | 5/1987 | Fugier et al. |
| 4,710,406 A | 12/1987 | Fugier |
| 4,757,108 A | 7/1988 | Walisser |
| 4,904,516 A | 2/1990 | Creamer |
| 5,296,584 A | 3/1994 | Walisser |
| 5,300,562 A | 4/1994 | Coventry et al. |
| 5,473,012 A | 12/1995 | Coventry et al. |
| 5,952,440 A | 9/1999 | Walisser et al. |
| 5,968,645 A | 10/1999 | Caccini et al. |

FOREIGN PATENT DOCUMENTS

| | | |
|---|---|---|
| EP | 0253488 A2 | 1/1988 |
| EP | 0818425 A1 | 1/1998 |
| EP | 0913413 A1 | 5/1999 |

*Primary Examiner*—Duc Truong
(74) *Attorney, Agent, or Firm*—Paul & Paul

(57) ABSTRACT

A phenol-formaldehyde resole resin is prepared using a high level of catalyst at a polymerization temperature of about 63° C. The endpoint, measured by salt water tolerance, is selected so that the resulting resin has a water dilutability of 20:1 at neutral pH after storage for three weeks at a temperature of about 13° C., with a free phenol level of no more than 0.50 percent.

62 Claims, No Drawings

LOW EMISSION FORMALDEHYDE RESIN AND BINDER FOR MINERAL FIBER INSULATION

This application claims the benefit of U.S. No. 60/129,615 filed on Jun. 17, 1999 and U.S. No. 60/141,294 filed on Jun. 26, 1999.

BACKGROUND OF THE INVENTION

1. Field of the Invention

The present invention relates to the manufacture of mineral fiber insulation materials, and more particularly to the preparation of phenolic resin for glass fibers.

2. Brief Description of the Prior Art

Aqueous dispersions of phenol-formaldehyde resole resins are frequently used in the manufacture of mineral fiber insulation materials, such as insulative glass fiber batts for walls, in roofs and ceilings, insulative coverings for pipes, and the like. Typically, after glass fiber has been formed, the still hot fiber is sprayed with aqueous binder dispersion in a forming chamber or hood, with the fibers being collected on a conveyer belt in the form of a wool-like mass associated with the binder. In some cases, a glass fiber web is sprayed with the aqueous dispersion. Both resole and urea-modified resole resins have been employed for this purpose, the urea contributing to the "punking" resistance of the binder (i.e., resistance to exothermic decomposition at elevated temperatures), and reducing volables liberated when the resin is cured at elevated temperature. A problem sometimes encountered in this process is "precure" of the binder. Ideally, the water associated with the binder first volatilizes leaving behind the resinous binder, then the binder cures. If the binder cures too quickly, subsequent drying of the product may become difficult, requiring additional energy, and reducing the quality of the product.

An excess of formaldehyde over phenol is typically used so as to minimize the free phenol in the reaction product Subsequently, other components (for example, urea and/or ammonia) may be included to scavenge free formaldehyde.

Frequently, in the manufacture of mineral fiber insulation materials, the aqueous resole resin is prepared in advance of the preparation of the binder, or is supplied by a resin manufacturer and stored until shortly before use. The resole is typically prepared by reaction of phenol and formaldehyde under basic conditions, the resulting reaction mixture being neutralized to a slightly basic pH by addition of a strong acid, to provide a water-dilutable resole. Although the aqueous resole resin can be stored at a reduced temperature, the resin contains chemically reactive species that continue to react during storage of the resin, increasing the average molecular weight of the resin and diminishing the water dilutability of the resin. If the resin is stored for too long a period, it may become unusable by virtue of increased molecular weight and diminished water dilutability. On the other hand, unless the resin is actually made at or near the site where it is going to be used, some storage and transportation are inevitable. Minimizing monomer emissions from resins that must be stored for extensive periods presents significant problems. If the resin is permitted to "cook" until monomer levels are minimized, storage stability can be severely compromised. On the other hand, terminating the condensation reaction early may provide good storage stability, but residual monomer concentrations are likely to remain high. Good storage stability and low monomer emissions appear to be mutually contradictory goals.

The binder is prepared by adding to the resole resin an acid catalyst for curing the resin, water to dilute the dispersion, and optionally other components, such as a silane glass-adhesion promoter, an oil emulsion lubricant, and urea to reduce volatile materials liberated during curing. Alternatively, a "premix" for the binder can be prepared by mixing the resin with a formaldehyde-scavenging agent, such as urea and/or ammonia, prior to the addition of the remaining components of the binder.

U.S. Pat. No. 5,296,584 discloses resole melamine dispersions for use as high temperature adhesives, in which melamine is solubilized in low formaldehyde-containing resole resin melt having a high base or alkali ratio. The resulting uncured resinous compositions show improved water solubility.

Reduction of residual free formaldehyde can be achieved by "over-condensing" the resin, such as disclosed in International Patent Application WO9903906.

Given the large volume of resinous binder compositions required in the production of fiberglass insulation and for other uses, and the need to minimize offensive emissions of formaldehyde and other compounds during manufacture, there is a continuing need for phenol-formaldehyde resin compositions which exhibit low emissions during cure, and yet which show good storage stability.

SUMMARY OF THE INVENTION

The present invention provides an improved method or process for preparing a phenolic resin for use as a binder for mineral fibers and giving lower emissions during cure than prior art processes, as well as an improved resin and an improved binder, and mineral fiber products made using the improved binder. Advantageously, the present process provides a reduction in both the level of the residual formaldehyde and the residual phenol, while maintaining the water solubility and the storage stability of the resultant phenolic resin at high levels, at neutral pH. The present invention provides a product having a good balance of shelf life, reduced monomer emissions, good processing characteristics and ease of use, and binder efficiency, while minimizing overall product costs. In comparison with prior art processes, both the residual free phenol and the residual free formaldehyde are advantageously reduced by the process of the present invention. While the prior art provides various strategies for reducing free formaldehyde, the reduction of free phenol has proven more problematic since phenol is the limiting reagent. The present invention provides a reduction in free phenol overcoming a significant deficiency of such prior art processes. Simultaneously, the present invention provides a resin with an extended stability or shelf life, a significant and unexpected result when viewed in connection with the residual free monomer reduction.

The process comprises preparing a water-soluble resin, preferably a water-soluble phenol-formaldehyde resole resin, from three components: (1) at least one hydroxy-functional aromatic compound, preferably phenol, (2) at least one reactive aldehyde, preferably formaldehyde, and (3) at least one basic polymerization catalyst, preferably an alkali metal base or alkaline earth metal base. An initial aqueous mixture is first prepared. The initial aqueous mixture includes the at least one hydroxy-functional aromatic compound and a second component selected from the at least one reactive aldehyde and the at least one basic polymerization catalyst The third component, that is the at least one reactive aldehyde when the basic polymerization catalyst is mixed with the at least one hydroxy-functional aromatic compound to form the initial aqueous mixture, or the basic polymerization catalyst when the at least one reactive aldehyde is mixed with the at least one hydroxy-functional aromatic compound to form the initial aqueous polymerization mixture, is then added to the initial aqueous polymerization mixture.

In the process of the present invention, a high level of catalyst is employed to reduce residual monomers and simultaneously minimize the proportion of high molecular weight species in the product. High molecular weight species undesirably reduce the water solubility of the resin product and reduce its storage stability. Further, since free formaldehyde tends to solubilize some such high molecular weight species, processing difficulties can be encountered when a free formaldehyde scavenger such as urea is added to the resole resin to form a premix for preparing a binder for mineral fibers, as this may cause the high molecular weight species to precipitate.

On the other hand, the extent of reaction is preferably carefully monitored during the process of the present invention so that overcondensation, resulting in reduced water solubility and reduced storage stability, is avoided.

Preferably, the amount of catalyst employed in the present process is at least 15 (and more preferably 17) moles catalyst per 100 moles hydroxy-functional aromatic compound. Preferably, the amount of catalyst employed in the present process is preferably no more than 60 (and more preferable no more than 40) moles catalyst per 100 moles hydroxy-functional aromatic compound. It is preferred that the amount of catalyst employed in the present process be from 15 to 60 moles catalyst per 100 moles hydroxy-functional aromatic compound, more preferably from 17 to 40 moles catalyst per 100 moles hydroxy-functional aromatic compound, with about 17.6 moles catalyst per 100 moles hydroxy-functional aromatic compound being especially preferred.

Preferably, a mixture of basic catalysts is employed. It is preferred to use a mixture of sodium hydroxide and potassium hydroxide, preferably in a molar ratio of from 0.25:1.00 potassium hydroxide/sodium hydroxide to 4:1 potassium hydroxide/sodium hydroxide, more preferably in a molar ratio of 0.5:2.00 potassium hydroxide/sodium hydroxide to 2:1 potassium hydroxide/sodium hydroxide, with a molar ratio of about 1:1 potassium hydroxide/sodium hydroxide being especially preferred.

In one aspect of the process of the present invention, the reactive aldehyde is fed to the initial aqueous mixture including the hydroxy-functional aromatic compound and the catalyst. Alternatively, the catalyst can be fed to an initial aqueous mixture including the hydroxy-functional aromatic compound and the reactive aldehyde. In either case, preferably, sufficient reactive aldehyde is employed so that the final mole ratio of reactive aldehyde to hydroxy-functional aromatic compound is from 2.0:1 to 5.0:1; more preferably from 2.5:1 to 5.0:1; still more preferably from 3.0:1 to 4.5:1; most preferably from 3.2:1 to 4.1:1.

Preferably, while the third component, such as the formaldehyde, is being fed, the temperature of the aqueous mixture is maintained from 50° C. to 75° C.; more preferably from 60° C. to 70° C.; still more preferably from 60° C. to 65° C.; and maintaining the temperature of the aqueous mixture at about 63° C. being especially preferred.

After completion of the addition of the third component, the temperature of the reaction mixture is preferably maintained within a desired range until a predetermined endpoint is achieved. Preferably, the temperature of the aqueous mixture is maintained from 50° C. to 75° C.; more preferably, from 60° C. to 70° C.; still more preferably, from 60° C. to 65° C., with a temperature of about 63° C. being especially preferred.

The temperature is preferably maintained sufficiently high so that the condensation reaction can occur rapidly, yet not so rapidly that it reduces the selectivity of the process. In addition, the selectivity of the methylolabon reaction, which is desired, to the condensation reaction, which builds molecular weight and is thus not desirable, decreases with an increase in temperature. Thus, the use of high temperatures tends to favor the increase in molecular weight and undesirably tends to reduce the water solubility and shelf life of the product.

The endpoint can be determined by an analytical technique that samples the extent of polymerization. Preferably, the endpoint is determined by measuring the salt-water tolerance of the reaction mixture. As the polymerization continues, the salt-water tolerance decreases as more higher molecular weight species are formed. It is preferred that the reaction temperature of the reaction mixture be maintained within the desired range until the salt-water tolerance has decreased to from 260 percent to 170 percent, and more preferably from 230 percent to 200 percent.

The endpoint is predetermined based on the properties of the resulting resole resin, and the extent of reaction is preferably measured to determine the endpoint of the reaction, such as by the salt-water tolerance test. The reaction is carried out until the objective of simultaneously minimizing the residual free monomer content of the resin while maximizing the water dilutability and storage stability of the resin is met at neutral pH. Preferably, the end point is selected so that the resulting resole resin has sufficient water solubility so that it can be diluted with water to a ratio of 20:1 after at least three weeks storage at a temperature of about 13° C., and preferably in the range of 9 to 13° C., and yet has a free phenol content no more than 0.5 percent by weight of the liquid resin, and preferably reduced by at least 20 percent by weight of the liquid resin relative to a resin having the same monomer composition and produced by prior art methods. In some cases, where reduced storage stability can be tolerated, the condensation reaction can be extended to even further reduce the free monomer content of the resin produced by the process of the present invention, in which case the emissions observed when the resin is used will be even further reduced themselves. In such cases, the predetermined endpoint is selected to provide the further reduced free monomer content.

Once the predetermined endpoint has been achieved, the aqueous mixture is cooled. Preferably, the aqueous mixture is cooled until a temperature of from about 20 to 30° C. is achieved.

Next, the aqueous mixture is optionally neutralized by addition of an acidic material. Preferably, the aqueous mixture is acidified to a neutral pH, such as to a pH in the range from about 5 to 9. Preferably, the aqueous mixture is acidified using at least one strong acid selected from sulfamic acid, sulfuric acid, formic acid, acetic acid, boric acid and phosphoric add, and mixtures thereof. Salts of sulfamic acid, sulfuric acid, formic acid, acetic add, boric acid, and phosphoric acid may also be used. More preferably, a split charge of sulfuric and sulfamic acid is used, preferably with a mole ratio of 1:3 of sulfuric acid to sulfamic acid.

The process of the present invention thus provides a phenol-formaldehyde resole resin having (a) a monomer composition of 2.0:1 to 5.0:1 formaldehyde to phenol on a molar basis, (b) a pH of from about 5 to 9, and (c) sufficient water solubility at neutral pH so that it can be diluted with water to a ratio of 20:1 after at least three weeks storage at a temperature at 13° C.

The resulting phenol-formaldehyde resole resin can be used to prepare a binder composition for mineral fiber insulation. The binder can be prepared by adding a catalyst for curing the resole resin. In completing preparation of the aqueous binder composition, other typical binder components, such as an acid elevated temperature cure catalyst, a mineral oil lubricant, and an organo-silane adhesion promoter, and one or more nitrogenous reactants for scavenging residual formaldehyde, such as urea and/or ammonia to further minimize free formaldehyde emissions, can be added to the aqueous mixture of the resole resin. Such components can be added to the aqueous mixture of resole resin shortly before application of the binder to the glass fibers. Alternatively, the nitrogenous reactants can be added to the resole resin to form a "premix" which can be subsequently used in formulating the binder.

The present invention also provides a process for producing a mineral fiber batt, which comprises preparing a binder as described above and spraying the binder on mineral fibers, such as glass fibers, to form a batt; and then curing the binder at an elevated temperature. The process of the present invention advantageously provides a binder with improved precure characteristics, in that the wet, resin-treated mineral fiber batt is more likely to dry before cure advances significantly than prior art binders.

The method of the present invention advantageously provides for reduced overall emissions during preparation of glass fiber batts. Targeted emissions include formaldehyde, phenol, volatile phenolics, volatile organic compounds (VOC) and total organic carbon (TOC).

DETAILED DESCRIPTION OF THE PREFERRED EMBODIMENTS

The phenol-formaldehyde resole resin of the present invention can be prepared using conventional components known in the art, such as commercial grade phenol and formaldehyde materials. For example, the formaldehyde can be provided in the form of an aqueous formalin solution have 30–55 percent by weight formaldehyde, although other forms of formaldehyde known to the art can also be used.

In addition to phenol itself, other hydroxy-functional aromatic compounds can be employed, or used in addition to phenol. Examples of substituted phenols that can be used include alkyl-substituted phenols, such as o-cresol, m-cresol, and p-cresol, 3,5-xylenol, 3,4xylenol, 3,4,5-trimethyl phenol, 3-ethyl phenol, 3,5-diethyl phenol, p-butyl phenol, 3,5 dibutyl phenol, p-amyl phenol, and p-octyl phenol; cycloalkyl-substituted phenols such as cyclohexyl phenol and 3,5-dicyclohexyl phenol; alkenyl-substituted phenols; aryl-substituted phenols such as p-phenyl phenol; alkoxy-substituted phenols such as 3,5-dimethyoxyphenol, p-ethoxy phenol, p-butoxy phenol, and 3,4,5-trimethoxyphenol; aryloxy phenols such as p-phenoxy phenol; and halogen-substituted phenols such as p-chlorophenol as well as polycyclic phenols such as napthol, anthranol, and substituted derivatives. Similarly, dihydric phenols such as catechol, resorcinol, hydroquinone, bisphenol A and bisphenol F can be used. However, phenol itself is especially preferred. Mixtures of phenols can also be used, preferably, mixtures which include phenol itself.

Similarly, other reactive aldehydes can be substituted in whole or in part for formaldehyde to produce the aqueous solution of water-soluble resole resin. Examples of other reactive aldehydes that can be used include acetaldehyde, propionaldehyde, furfuraldehyde, glutaraldehyde, and benzaldehyde. Formaldehyde is especially preferred.

The preparation of resole resins is reviewed and described in R. W. Martin, *The Chemistry of Phenolic Resins* (John Wiley & Sons, Inc., New York 1956) at 88–97.

The process of this invention relates to the preparation of a water-soluble resin, preferably a pheno-formaldehyde resole resin. A base-catalyzed condensation of the hydroxy-functional aromatic compound and the reactive aldehyde is used to prepare the resin. The reaction, which is exothermic, can be initiated after mixing the hydroxy-functional aromatic compound and the catalyst, by the addition of a feed of reactive aldehyde, such as an aqueous solution of formaldehyde. The proportion of the reactive aldehyde to hydroxy-functional aromatic compound is selected to yield a resole-type resin (stoichiometric excess of aldehyde), and when formaldehyde and phenol are used, the mole ratio of formaldehyde to phenol preferably is from about 2.0:1 to 5.0:1; more preferably from about 2.5:1 to 5.0:1; still more preferably from about 3.0:1 to 4.5:1; yet more preferably from about 3.2:1 to 4.1:1. As used herein, references to the mole ratio of formaldehyde to phenol are meant to refer to the initial mole ratio, unless otherwise stated.

The basic catalyst used in the process of preparing the resole resin can include at least one alkali metal base or alkaline earth metal base. Examples of alkali metal bases that can be used include the hydroxides of sodium, potassium, and lithium. Examples of alkaline earth metal bases that can be used include the oxides and hydroxides of calcium, barium and strontium, such as calcium oxide and calcium hydroxide. Potassium hydroxide or sodium hydroxide is preferred over calcium hydroxide. Other strongly basic water-soluble substances that do not react with formaldehyde, such as tertiary amines including triethylamine, tertiary amino alcohols such as 2-dimethylamino-2-methyl-1-propanol and 2-(dimethylamino)2-(hydroxymethyl)-1,3-propanediol, and the like, can also be used in catalyzing the preparation of the resole resin. Bases are preferably employed in the form of aqueous solutions, such as aqueous solutions of sodium hydroxide and potassium hydroxide. Preferably, the catalyst is selected from sodium hydroxide, potassium hydroxide, and mixtures thereof.

In the present process, a relatively high level of catalyst is employed to reduce residual monomers and simultaneously minimize the proportion of high molecular weight species in the product, in comparison with prior processes. High molecular weight species can undesirably reduce the water solubility of the resin produced by the process of this invention.

Preferably, the amount of catalyst employed in the present process is at least about 15 (and more preferably at least about 17) moles catalyst per 100 moles hydroxy-functional aromatic compound. Preferably, the amount of catalyst employed in the present process is preferably no more than about 60 (and more preferable no more than about 40) moles catalyst per 100 moles hydroxy-functional aromatic compound. It is preferred that the amount of catalyst employed in the present process be from about 15 moles to about 60 moles catalyst per 100 moles of hydroxy-functional aromatic compound (e.g., phenol), more preferably from about 17 to about 40 moles catalyst per 100 moles hydroxy-functional aromatic compound, with about 17.6 moles catalyst per 100 moles hydroxy-functional aromatic compound being especially preferred.

Preferably, a mixture of basic catalysts is employed, such as a mixture of sodium hydroxide and potassium hydroxide. Using a mixture of catalysts makes it less likely that salt crystallization will occur during resin use. When a mixture of sodium hydroxide and potassium hydroxide is used, they are preferably in a molar ratio of from about 0.25:1.00 potassium hydroxide to sodium hydroxide to about 4:1 potassium hydroxide to sodium hydroxide, more preferably in a molar ratio of about 0.5:2.00 potassium hydroxide/sodium hydroxide to about 2:1 potassium hydroxide to sodium hydroxide, with a molar ratio of about 1:1 potassium hydroxide/sodium hydroxide being especially preferred.

In the process of the present invention, a reactor is charged with an aqueous reaction mixture of phenol and a second component, such as the basic catalyst, and the third component, such as formaldehyde, is then added to the aqueous reaction mixture, the formaldehyde reacting exothermically with the phenol in the presence of the basic catalyst. Preferably, the phenol is first added to the reactor, and the second component, such as the basic catalyst, preferably in the form an aqueous solution, such as an aqueous solution of potassium hydroxide and an aqueous solution of sodium hydroxide, is then added to the phenol, to provide an aqueous reaction mixture. Alternatively, in the practice of the process of the present invention, the formaldehyde can be employed as the second component and the basic catalyst can be employed as the third component, with the phenol and formaldehyde being initially charged to the reactor and the basic catalyst being added to the reaction mixture.

In the process of the present invention, it is important to control the exothermic reaction of phenol and formaldehyde, such as by controlling the rate at which the third component, that is the formaldehyde or the basic catalyst, is fed to the reaction mixture. The temperature of the aqueous mixture is maintained while the formaldehyde is being fed in a range of from about 50° C. to about 75° C., more preferably from about 60° C. to about 70° C.; still more preferably, from about 60° C. to about 65° C., with a temperature of about 63° C. being especially preferred.

When the addition of second component, that is the formaldehyde or the basic catalyst, is begun, the temperature of the aqueous reaction mixture is permitted to rise from ambient temperature to a temperature as noted above. The temperature is then maintained in the desired range by adjusting the feed rate of the formaldehyde and/or by cooling the reaction vessel. The time required for the reaction to occur depends on the scale on which the exothermic reaction is being carried out.

The temperature of the aqueous reaction mixture is preferably maintained within a desired range until a predetermined endpoint is achieved. Preferably, until the predetermined endpoint is achieved, the temperature of the aqueous mixture is maintained from about 50° C. to about 75° C.; more preferably, from about 60° C. to about 70° C.; and still more preferably, from about 60° C. to about 65° C. It is especially preferred that the temperature of the aqueous mixture be maintained at about 63° C.

In the present process the endpoint of the reaction between the phenol and the formaldehyde is selected to be the point at which residual free formaldehyde and free phenol monomers are minimized while the storage stability of the resin, as measured by the water dilutability, continues to remain at a level acceptable on a practical basis. In particular, in the present process the endpoint is selected to be that point in the reaction at which the resole resin product has sufficient water solubility so that it can be diluted with water to a ratio of about 20:1, after at least three weeks storage at a temperature of about 13° C., and having a free formaldehyde content less than about 12 (and preferably less than about 9.8) percent by weight of the liquid resin, and a free phenol content no more than about 0.50 (more preferably about 0.40, still more preferably no more than about 0.3) percent by weight of the liquid resin. It is especially preferred to select the endpoint to produce a product having a free phenol content between about 0.15 and about 0.35 percent by weight of the liquid resin. The free formaldehyde content and the free phenol content of the resole resin product depend upon the initial mole ratio of the formaldehyde and phenol from which the product is prepared. When the mole ratio formaldehyde to phenol is 3.5:1, the process of the present invention provides a product having a free formaldehyde content at least as low as 9.8 percent by weight of resin solids, and a free phenol content at least as low as 0.35 percent by weight of resin solids.

Otherwise expressed, the process of the present invention preferably produces a resole resin product in which the free phenol content is reduced by at least about 20 percent in comparison with the free phenol content of resole resins having the same initial mole ratio of formaldehyde and phenol and produced by an otherwise identical process, but wherein the mole ratio of total catalyst to hydroxy-functional aromatic compound employed in the otherwise identical process is less than about 12 moles catalyst per 100 moles hydroxy-functional aromatic compound.

The process of the present invention still more preferably produces a resole resin product in which the free phenol content is reduced by at least 20 percent in comparison with the free phenol content of resole resins having the same initial mole ratio of formaldehyde and phenol and produced using a prior art process carried out to produce as little residual phenol as practical.

Determination of the endpoint presents practical problems of process control. The endpoint should be measured as quickly as possible by an appropriate analytical technique. Suitable techniques include determination of the salt water tolerance of the reaction mixture which quantity is a property subject to rapid measurement, such as within two or three minutes. Conversely, while such quantifies such as the free formaldehyde concentration and the free phenol concentration could also be determined, measurement of these quantifies is likely to require an unacceptably long time, such as about eight to ten minutes, during which time the reaction may have passed an acceptable level of polymerization.

When salt water tolerance is employed to sample the extent of reaction to determine the point at which the reaction should be terminated, or endpoint, it is preferred that the reaction continue until the endpoint as determined by measuring the salt-water tolerance of the reaction mixture has decreased to from about 260 percent to about 170 percent, and more preferably from about 230 to about 200 percent.

Once the end point has been attained, the aqueous reaction mixture is quickly cooled to a lower temperature, such as a temperature between about 20 degrees C. and 30 degrees C.

The aqueous reaction mixture can then be neutralized, if desired, by addition of acid, preferably to a pH of from about 5 to 9. Alternatively, the aqueous reaction mixture can be stored at an alkaline pH.

If the aqueous reaction mixture is to be neutralized, the aqueous mixture is preferably acidified using at least one strong acid, at least one salt of a strong acid, or mixtures of strong acids and/or salts of strong acids. Examples of strong acids that can be used include mineral acids such as sulfuric acid, including 25% sulfuric acid solution, sulfamic acid, hydrochloric acid, nitric acid, boric acid, and phosphoric acid and organic acids such as acetic acid, tricholoracetic acid, and aromatic di- and polysulfonic acids, including phenyl sulfonic acids, such as p-toluene sulfonic acid, and other organosulfonic acids. A mixture of acids can also be used to acidify the aqueous mixture, such as a mixture of two or more acids selected from the group consisting of sulfuric acid, acetic acid, boric acid and phosphoric acid. It is especially preferred that a split acid charge comprising sulfuric acid and sulfamic acid be used. Acids, such as sulfamic acid, that form soluble salts with the basic moieties in the resin are generally preferred to at least partially neutralize the basic resin, in order to increase the water solubility of the resin. However, the amount of such acids used is preferably limited so as to avoid possible adverse effects such as excessive water pickup, corrosive effects with respect to glass fibers, and recovery of the glass fiber mat after compression. The amount of such acids can be limited by substituting another acid, such as sulfuric acid, for a portion of the charge of the soluble-salt forming acid, such as sulfamic acid. It is especially preferred that a split acid charge comprising sulfuric acid and sulfamic acid be used. Splitting the acid charge makes it less likely that salt crystallization will occur during resin use.

Typically, the process is selected to provide an aqueous resole resin with total solids of about 40 to 50 percent by weight The aqueous resole resin can also include small amounts of residual formaldehyde, such as up to about 15 percent by weight of the liquid resin, and small amounts of residual phenol, such as up to about 2 percent by weight of the liquid resin, although the residual free formaldehyde is preferably at least less than 12 percent by weight of the liquid resin, and the residual free phenol is at least as low as 0.35 percent by weight of the liquid resin. In addition, the aqueous resole resin will typically contain small amounts of residual sodium, calcium or like salts from the catalyst and subsequent neutralization.

In calculating the residual phenol and residual formaldehyde and comparing residual monomers measured for different preparations, care should be taken to determine at what point in the preparative process the residual monomer (s) is determined. In the present disclosure, unless otherwise stated, the residual monomer is expressed as the percentage by weight, based on liquid resin, before the resin has been acidified or neutralized. If the percent by weight, based on the resin solids is desired, a correction for the total solids of the resin must be made. For example, if the residual phenol were determined to be 0.29 percent by weight based on the liquid resin, and the resin had total solids of 45.7 percent, the residual phenol based on resin solids would be 0.63 percent by weight based on resin solids. Further, it should be noted that acidification or neutralization of the resin will dilute the resin, and the effect of dilution on the residual monomer may need to be considered.

After preparation of the aqueous resole resin has been completed, the aqueous resin can be packaged, as by drumming, and stored until needed or transferred to a transportation vehicle such as a tank wagon or rail car and shipped to another site where binder for mineral fiber articles is to be produced.

The aqueous resole resin produced can be used to prepare an aqueous binder for articles formed using mineral fibers. Typically, in such articles, the mineral fibers, such as glass fibers, are initially formed into a non-woven mat. An aqueous binder including the resole resin is typically sprayed on newly formed, still hot, glass fibers in a forming chamber or like apparatus to yield a wool-like mass including the glass fibers, bound by the resin binder. The characteristics and utility of the article produced are determined to some extent by the type of mineral fiber used, the length and diameter of the fibers, the density, oxidation, and concentration of the fibers in the mat, and the like. For some applications, it may be desirable to weave the fibers or otherwise form a fabric from the fibers.

The process of the present invention also includes the preparation of a "premix" from the aqueous resole resin product for use in preparing the binder. The premix includes the resole resin and at least one other component, such as urea, ammonia, or another nitrogenous reagent, for reaction with residual formaldehyde in the binder in order to further reduce formaldehyde emissions. For example, a premix can be prepared by mixing resin, urea and optionally ammonia. Preferably, the premix is prepared by mixing from 50 to 80 parts resole (on resin solids basis), from 20 to 50 parts urea (on a urea solids basis), and from 0 to 6 parts ammonia (on an ammonia solids basis), and then adding sufficient water to adjust the premix solids to 35 to 45% solids. The premix is stirred under gentle agitation for about eight to ten hours prior to use in a binder. The resin is added at the "as received" solids content, typically 40 to 55% by weight. The urea is generally added as a solution with a concentration of 30 to 50% by weight The aqueous ammonia is usually at 29 to 30% weight.

Depending on the storage stability required, a formaldehyde scavenger such as urea and/or ammonia can be added to the aqueous resole resin before packaging, storing or shipping the resin to form a "premix" as described above. Alternatively, the "premix" can be prepared shortly before the resin is to be used, or a portion can be added at the time when resin is prepared with a subsequent addition of one or more formaldehyde scavengers to the resin at the time the resin is to be used.

The process of the present invention further included subsequently completing preparation of the binder by adding a catalyst, such as a latent acid catalyst, for curing the resole resin.

Examples of catalysts for curing the resole resin include acid catalysts such as strong acids or salts, preferably ammonium or amino salts of acids, such as ammonium sulfate, ammonium phosphate, ammonium sulfamate, ammonium carbonate, ammonium acetate, ammonium maleate, and the like. The acid catalyst can be added in an amount of from about 0.1 to 5 percent by weight based on the weight of the resole resin.

Completing preparation of the binder can also include addition of a lubricant composition, such as a mineral oil emulsion, and a material promoting adhesion of the modified resole resin to the glass fibers, such as a suitable silane. An example of an adhesion-improving silane that can be added is 3-aminopropyl triethoxysilane. Other additives such as finely divided mineral fibers, non-reactive organic resins such as Vinsol (trademark of Hercules) resin (derived from rosin), tall oil, surface active compounds such as lignosulfonate salts, thickeners and rheology control agents, dyes, color additives, water, and the like, can also be added to the aqueous binder.

A suitable mixing vessel equipped with an agitator can be used to prepare the binder. Water is added to the mixing vessel to reach the bottom of the agitator, followed by silane coupling agent. The silane can be added either undiluted or at 2% solids and typically 0.1 to 0.5 parts by weight per 100 parts resin on a solids basis. A catalyst such as ammonium sulfate added either as a solid or a solution, typically 10%. The catalyst is generally added at 1 to 6 parts by weight solids per 100 parts resin on a solids basis. After sufficient mixing to dissolve or disperse the catalyst a premix including the resin and a nitrogenous reactant such as urea is added to the mixture. Oil or an oil emulsion is then added to control the dust in the finished product. Various amounts of oil or oil emulsion can be added, but typically the amount is 10 to 20 parts solids. A sufficient quantity of water can then be added to the binder to adjust the binder solids to 5 to 30% solids. If necessary, ammonia can be used to adjust the pH of the binder. The pH is typically 6.5 to 8.0. Throughout this procedure agitation is used to thoroughly mix the components.

Prior to application of the binder, the binder can be diluted by addition of water to provide a concentration suitable for application to the hot mineral fibers or mineral fiber web or mat. For example, water can be added to provide a total solids content of from about 1 to 80 percent by weight.

The aqueous binder can be applied directly to newly formed, still hot glass fibers, or to a mineral fiber mat or fabric, and subsequently dried and cured to form an article. The mineral fiber can be a glass fiber, and the mat can be a non-woven mat. The mineral fibers can be continuous or chopped or can take the form of a mineral fiber wool. When glass fiber is used, it can be formed by any conventional process, such as by flame or steam blowing, by centrifugal fiberizing, or the like. The shape, fiber, density, fiber lengths, fiber orientation, and like characteristics of the fiber mat depend on the application intended for the articles produced. One especially important application is thermal insulation. In this case, the fiber mats take the form of continuous rolls or batts of non-woven, randomly oriented glass fibers. A similar mat is used in the production of glass fiber batts for acoustic insulation.

When thermal and acoustic glass fiber insulation is to be produced, the newly formed, still hot glass fibers are typically sprayed in a forming chamber or hood with the aqueous binder to distribute a coating of binder over the fibers, and especially at contact points between fibers. If the hot fibers do not have sufficient heat content to drive off the water, the mat coated with the aqueous binder solution can be subsequently thermally dried to remove water. In either case, the resinous compounds including the resole are cured to form an infusible binder for the mineral fiber mat.

The present invention thus provides a process for preparing a mineral fiber mat product This process comprises preparing a phenolic binder for mineral fibers by a process which includes preparing a suitable a water-soluble resin by the process described above.

Notably, the process for preparing the resin requires the mole ratio of total catalyst to hydroxy-functional aromatic compound to be at least 15 moles (and preferably 17 moles) catalyst per 100 moles hydroxy-functional aromatic compound. This has been observed to result in substantial reductions in the emissions of both formaldehyde and phenol during cure of the mineral fiber mat product.

The process for preparing the mineral fiber mat includes completing preparation of the binder by adding a catalyst for curing the resin, applying the binder to a mineral fiber mat and curing the binder comprising the resin and the cure catalyst. As noted above, the binder is typically cured by application of heat in a suitable oven. During the cure, some of the residual formaldehyde and phenol volatilize, and it is desirable to minimize the amounts of these compounds which do so.

Advantageously, in the present process for preparing a mineral fiber mat, the amount of phenol and the amount of formaldehyde measured in the stack effluent gases during application and cure of the binder are reduced by at least 20 percent (and in some cases at least 50 percent or as much as 55 percent) compared with a mineral fiber mat prepared by the same process, except that the resin is prepared using a mole ratio of total catalyst to hydroxy-functional aromatic compound less than 15 moles catalyst per 100 moles hydroxy-functional aromatic compound.

Although, the mineral fiber mat of the present invention may have a density from 5 $kg/m^3$ to 160 $kg/m^3$, preferably, the mineral fiber mat of the present invention preferably has a density less than 40 $kg/m^3$, and more preferably a density of about 8 $kg/m^3$. Although, in the case of high density mineral fiber mats prepared by the process of the present invention, the L.O.I. (loss on ignition) can be as high as 10 to 15 percent by weight, it is preferred that the mineral fiber mat of the present invention have a L.O.I of from 4 to 6 percent by weight A measure of the shelf-life of a resin or binder according to the present invention is provided by the water-dilution test. The resin or binder is considered to have adequate shelf life if it can be diluted with water to a ratio of at least 20:1 at neutral pH and remain crystal clear to the eye for at least 10 minutes, a result which is believed to be indicative of a low level of phase separation and consequent light scattering by a resin phase dispersed in the water phase. Optionally, the clarity of the resin or binder can be assessed by measuring turbidity with a turbidity meter. Clarity is considered lost when the resin or binder shows a turbidity in excess of about 30 NTU (national turbidity units). Other measures of light scattering and/or turbidity can be employed to assess the water-dilutability of the resin or binder. As is known in the art, the results of a water-dilution test can depend on the pH so that a resin solution containing high molecular weight species such that the solution would fail the test at a neutral pH, could conceivably pass the test if the test were carried out at an alkaline pH.

The following test methods are employed:

Salt Water Tolerance

This test method is used for determining the degree of condensation, that is, how far advanced a resin is. The test is simple, quick, and easy the method for an in-process determination of the endpoint while manufacturing a resole.

Test Description: A 25% w/w sodium chloride solution is prepared and held at 25° C. A sample of resin to be tested is weighed into a dean test tube. The weight of the sample is recorded. The test tube containing the resin is cooled to 25° C. as well. The 25% sodium chloride solution is slowly added to the resin while agitating until a distinct change occurs. The contents will remain cloudy or turbid. The test tube containing resin and salt solution is reweighed. The percent salt water tolerance is calculated by finding the difference between the final weight and the sample weight, dividing by the sample weight, and multiplying the result by 100. The results indicate the how far advanced the resin is at the time of sampling.

Percent Free Formaldehyde

This test method is used for in process and final free formaldehyde determination.

Test Description: A 10% hydroxylamine hydrochloride is used which reacts with dissociated free formaldehyde, resulting in the liberation of hydrochloric acid. This liberated acid is then titrated with base solution. A given weight of resin is weighed and recorded. 50 ml of 50/50 water/methanol is added. The pH of the solution is adjusted to 4.0. The 10% hydroxylamine hydrochloride is added resulting in a drop in pH. After five minutes, the solution is then titrated back to a pH of 4.0. A calculation is performed based on resin sample weight, volume (milliliters) used, and normality of the base to determine percent free formaldehyde.

EXAMPLE 1

238.22 g of 100% phenol is added to a clean reactor followed by the addition of 27.91 g of potassium hydroxide (45.5%) with agitation, followed by addition of 18.12 g of sodium hydroxide (50.0%). An exotherm occurs after the catalysts are added to the phenol. The contents of reactor are sampled after adequate agitation of the contents and the refractive index and alkalinity are measured. Formaldehyde (54 wt % formalin solution) is slowly fed to the reactor under full vacuum until reflux is established. The formaldehyde feed rate is gradually increased as batch temperature and control is established. The reaction mixture batch target temperature is 63° C. After 492.68 g of formaldehyde have been added, a sample is taken and checked for alkalinity and water dilutability. At this point if everything is in range, the reaction mixture is held at 63° C. until the reaction endpoint is reached, as determined by salt-water tolerance (target-salt water tolerance of 200%). When the endpoint is reached, the reaction mixture is immediately cooled to 40° C. With the reaction mixture cooled, neutralization begins by the addition of 262.94 g of 19% sulfamic acid solution. After this addition, the pH and water dilutability are determined. The reaction mixture is then neutralized using 20.73 g of 25% sulfuric acid and 39.41 g of water. The reaction mixture is then cooled below 40° C. and pumped to storage. The final free formaldehyde of the reaction mixture is 7.3% and final free phenol is 0.25%.

The molecular weight of the resultant product is determined by gel permeation chromatography, the product having a weight average molecular weight of 296 and a number average molecular weight of 242, with a ratio of $M_w/M_n$ of 1.223. The molecular composition of the product is determined by derivatizing the hydroxyl group using N,O-bis (trimethylsilyl)trifluoroacetamide (BSTFA) and subjecting the derivative mixture to gas chromatography (GC) with the following results:

TABLE A

| Species | Weight Percent |
|---|---|
| phenol | 3.06 |
| 2-methylol phenol | 2.26 |
| 4-methylol phenol | 3.79 |
| 2,4-dimethylol | 10.59 |
| 2,4,6-trimethylol | 51.54 |
| tetradimer | 28.76 |

EXAMPLE 2 AND 3

The process of Example 1 is repeated, except that the following reactants are employed:

TABLE B

| Reactant | Example 2 | Example 3 |
|---|---|---|
| phenol (100% w/w) | 227.82 g | 218.30 g |
| formaldehyde (50% w/w) | 552.50 g | 571.21 g |
| KOH (45.5% w/w) | 26.69 g | 25.57 g |
| NaOH (50.0% w/w) | 17.32 g | 16.59 g |
| sulfuric acid (25% w/w) | 18.83 g | 19.00 g |
| sulfamic acid (19.0% w/w) | 155.84 g | 149.33 g |

Comparative Example 1–3

The process of Example 1 is repeated, except that the following reactants are employed, and the formaldehyde and phenol are mixed initially, and the catalyst is added slowly to the reaction mixture to provide Comparative Example 2. In the case of Comparative Example 1, the process of Comparative Example 1 is repeated, but urea is added after the reaction mixture has cooled in order to scavenge free formaldehyde. For Comparative Example 3, the process of Example 1 is repeated, except that a low level of catalyst is used (about 13 mole percent):

TABLE C

| Reactant | Comparative Example 1 | Comparative Example 3 |
|---|---|---|
| phenol (100% w/w) | 245.11 g | 258.87 |
| formaldehyde (50 % w/w) | 627.28 g | 578.22 |
| KOH (45.5% w/w) | 19.26 g | 13.59 |
| NaOH (50.0% w/w) | 12.52 g | 21.08 |
| urea | 44.85 g | |
| sulfuric acid (25% w/w) | 50.98 g | 15.60 |
| water | | 91.23 |

The properties of the exemplary resins are summarized as follows:

TABLE D

|  | Comparative Example 1 | Comparative Example 2 | Comparative Example 3 | Example 1 | Example 2 | Example 3 |
|---|---|---|---|---|---|---|
| formaldehyde:phenol (w/w) | 4.0:1 | 4.0:1 | 3.5:1 | 3.5:1 | 3.8:1 | 4.1:1 |
| monomer composition | PF[1] + 10% urea | PF | PF | PF | PF | PF |
| endpoint salt water tolerance |  |  | 230 | 230 | 230 | 230 |
| endpoint free formaldehyde (% w/w) | 13.9% | 13.9% | 10.9% | 9.4% | 11.3% | 13.0% |
| endpoint free phenol (% w/w) | 0.70 | 0.70 | 0.83 | 0.35 | 0.30 | 0.24 |
| Percent solids |  |  |  | 45.7 |  |  |
| neutralization | sulfuric | sulfuric | sulfuric/sulfamic | sulfuric/sulfamic | sulfuric/sulfamic | sulfuric/sulfamic |
| Final properties |  |  |  |  |  |  |
| free formaldehyde (% w/w) | 9.0[3] | 13.0 | 9.6 | 7.7 | 9.3 | 10.8 |
| free phenol (% w/w) | 0.63[3] | 0.67 | 0.72 | 0.29 | 0.25 | 0.20 |
| percent solids | 45.0[3] | 43.0 | 43.2 | 43.0 | 41.5 | 40.4 |

[1]"PF" = phenol-formaldehyde
[2]qualitative scale, "1" is best.
[3]Urea (10% on solids basis) has dilution effect on final properties and reacts with formaldehyde.

The results in Table D show the effect of dilution by neutralization on the residual free phenol and formaldehyde.

The effect of adding the formaldehyde scavengers urea and ammonia to resins of the present invention in order to form "premixes" for the preparation of binders are compared as follows:

TABLE E

|  |  | Comparative Example 1 | Example 1 | Example 2 | Example 3 |
|---|---|---|---|---|---|
| Premix: | 60/40/1[1] |  |  |  |  |
| FF/urea |  | 0.986 | 0.535 | 0.650 | 0.821 |
| effective FF/urea[2] |  | 0.787 | 0.403 | 0.517 | 0.678 |
| Premix: | 60/35/1[1] |  |  |  |  |
| FF/urea |  | 1.114 | 0.663 | 0.804 | 1.004 |
| effective FF/urea[2] |  | 0.962 | 0.511 | 0.653 | 0.853 |

[1]Weight ratio of phenol-formaldehyde resin to urea to ammonia.
[2]Reduced by amount of formaldehyde reacting with ammonia (fast reaction).

Emissions of free formaldehyde and free phenol were tested in laboratory scale experiments for premixes prepared from Examples 1–3 and Comparative Example 1 with the following results.

The results demonstrate a significant reduction in emissions of both formaldehyde and phenol for the resins prepared according to the process of the present invention.

TABLE F

| Resin | Premix ratio[1] | Percent Phenol | Percent Formaldehyde |
|---|---|---|---|
| Example 1 | 60/40/1 | 1.3 | 0.8 |
| Example 2 | 60/40/1 | 1.2 | 1.199 |
| Example 3 | 60/40/1 | 0.9 | 1.6 |
| Comp. Ex. 1 | 60/40/1 | 1.9 | 1.7 |

[1]Weight ratio of resin to urea to ammonia

Emissions of formaldehyde and phenol were measured in stack effluent gases during application of binders based on resins of the present invention to glass fiber mats, using industry and EPA standard test methods, and providing the following results:

TABLE G

| Resin | Phenol (lbs/hour) | Formaldehyde (lbs/hour) |
|---|---|---|
| Example 1 | 1.7 | 3.3 |
| Example 3 | 0.63 | not determined |
| Comp. Ex. 1 | 3.7 | 9.7 |

These results demonstrate a significant reduction in stack emissions.

The mats that have been used to make those measurements are low density products, of around 8 kg/m$^3$ (below 40 kg/m$^3$). They contain an amount of binder of around 5.2% expressed in L.O.I (the percentage of weight loss of the mat if burnt). The process of the present invention can be used to make mats having other densities, for example, mats with densities of from 5 kg/m$^3$ to 160 kg/m$^3$.

The binders of the Examples 1 and 3, along with the Comparative Example 1, have been made the following way from the resins described previously in the specification.

Each binder contains:

60 parts by weight of resin 40 parts by weight of urea 2 parts by weight of ammonia (corresponding to this amount in gaseous ammonia)

1 part by weight of ammonium sulfate 12 parts by weight of oil 0.16 part by weight of silane compound Each binder is in aqueous phase. The resin, urea and ammonia are the "premix" referred to previously in the specification.

For each binder of the present invention measured, the emissions of formaldehyde and phenol in the curing oven have been decreased by at least 20 percent, and in some cases by 55 percent, compared with products made using otherwise identical binders based on resins prepared by a prior art process.

Various modifications can be made in the details of the various embodiments of the processes, compositions and articles of the present invention, all within the scope and spirit of the invention and defined by the appended claims.

We claim:

1. A process for preparing a water-soluble resin for mineral fibers, the process comprising reacting three components: (1) at least one hydroxy-functional aromatic compound, (2) at least one reactive aldehyde, and (3) at least one basic polymerization catalyst; the process including:
   a) preparing an initial aqueous mixture including at least one hydroxy-functional aromatic compound and a second component selected from the group comprising (1) at least one reactive aldehyde and (2) at least one basic polymerization catalyst;
   b) feeding the third component to the initial aqueous mixture while the temperature of the aqueous mixture is maintained from about 50° C. to about 75° C.; the mole ratio of total catalyst to hydroxy-functional aromatic compound being at least 17 moles catalyst per 100 moles hydroxy-functional aromatic compound;
   c) maintaining the temperature of the aqueous mixture in a range from about 50° C. to about 75° C. until a predetermined endpoint is achieved; and
   d) cooling the aqueous mixture.

2. A process according to claim 1 wherein the first component is phenol, the second component is at least one basic polymerization catalyst and the third component is formaldehyde.

3. A process according to claim 1 wherein the first component is phenol, the second component is formaldehyde and the third component is at least one basic polymerization catalyst.

4. A process according to claim 1 wherein the temperature of the aqueous mixture is maintained while feeding the third component by controlling the rate at which the third component is being fed.

5. A process according to claim 1 wherein the mole ratio of total catalyst to hydroxy-functional aromatic compound is about 17 to 40 moles catalyst per 100 moles hydroxy-functional aromatic compound.

6. A process according to claim 5 wherein the mole ratio of total catalyst to hydroxy-functional aromatic compound is about 17.6 moles catalyst per 100 moles hydroxy-functional aromatic compound.

7. A process according to claim 1 wherein the at least one basic polymerization catalyst comprises a mixture of basic catalysts.

8. A process according to claim 7 wherein the mixture of basic catalysts comprises a mixture of sodium hydroxide and potassium hydroxide.

9. A process according to claim 8 wherein the mixture of sodium hydroxide and potassium hydroxide has a molar ratio of from about 0.25:1.00 potassium hydroxide/sodium hydroxide to about 4:1 potassium hydroxide/sodium hydroxide.

10. A process according to claim 9 wherein the mixture of sodium hydroxide and potassium hydroxide has a molar ratio of from about 0.5:1.00 potassium hydroxide/sodium hydroxide to about 2:1 potassium hydroxide/sodium hydroxide.

11. A process according to claim 10 wherein the mixture of sodium hydroxide and potassium hydroxide has a molar ratio of about 1:1 potassium hydroxide/sodium hydroxide.

12. The process of claim 2 wherein the temperature of the aqueous mixture is maintained from about 60° C. to about 70° C. while the formaldehyde is being fed.

13. The process of claim 12 wherein the temperature of the aqueous mixture is maintained from about 60° C. to about 65° C. while the formaldehyde is being fed.

14. The process of claim 13 wherein the temperature of the aqueous mixture is maintained at about 63° C. while the formaldehyde is being fed.

15. The process of claim 1 wherein the temperature of the aqueous mixture is maintained from about 60° C. to about 70° C. until a predetermined endpoint is achieved.

16. The process of claim 15 wherein the temperature of the aqueous mixture is maintained from about 60° C. to about 65° C. until a predetermined endpoint is achieved.

17. The process of claim 16 wherein the temperature of the aqueous mixture is maintained at about 63° C. until a predetermined endpoint is achieved.

18. The process of claim 1 wherein the endpoint is determined by measuring the salt-water tolerance of the reaction mixture to be from about 260 percent to about 170 percent.

19. The process of claim 18 wherein the endpoint is determined by measuring the salt-water tolerance of the reaction mixture to be from about 230 percent to about 200 percent.

20. The process of claim 2 wherein the endpoint is determined to provide a resin product having sufficient water solubility so that it can be diluted with water to a ratio of 20:1 at neutral pH after at least three weeks storage at a temperature of about 13° C., and having a free formaldehyde content less than 12 percent by weight of the liquid resin, and a free phenol content no more than 0.50 percent by weight of the liquid resin.

21. The process of claim 1 wherein the resin product has free phenol content that is at least 20 percent less than the free phenol content of an otherwise identical process wherein the mole ratio of total catalyst to hydroxy-functional aromatic compound employed in the otherwise identical process is less than about 12 moles catalyst per 100 moles hydroxy-functional aromatic compound.

22. The process of claim 1 wherein sufficient formaldehyde is used so that the mole ratio of reactive aldehyde to hydroxy-functional aromatic compound is from about 2.0:1 to 5.0:1.

23. The process of claim 22 wherein the mole ratio of reactive aldehyde to hydroxy-functional aromatic compound is from about 2.5:1 to 5.0:1.

24. The process of claim 23 wherein the mole ratio of reactive aldehyde to hydroxy-functional aromatic compound is from about 3.0:1 to 4.5:1.

25. The process of claim 24 wherein the mole ratio of reactive aldehyde to hydroxy-functional aromatic compound is from about 3.2:1 to 4.1:1.

26. The process of claim 1 further comprising neutralizing the aqueous mixture to pH between 5 and 9.

27. The process of claim 1 wherein the aqueous mixture is neutralized using at least one acid selected from sulfamic acid, sulfuric acid, formic acid, acetic acid, boric acid, and phosphoric acid, and salts thereof.

28. The process of claim 27 wherein the aqueous mixture is neutralized with sulfamic acid and sulfuric acid.

29. The process of claim 28 wherein the aqueous mixture is neutralized with a split charge of sulfuric acid and sulfamic acid, the ratio of sulfuric acid to sulfamic acid being about 1:3 on an equivalent basis.

30. A resin prepared according to the process of any of claim 1–29.

31. A phenol-formaldehyde resole resin, having
   (a) a mole ratio of formaldehyde to phenol is from 2.0:1 to 5.0:1;
   (b) a pH from 5 to 9;
   (c) sufficient water solubility so that it can be diluted with water to a ratio of 20:1 at neutral pH after at least three weeks storage at a temperature of about 13° C.; and (d) a free phenol content no more than 0.50 percent by weight of the liquid resin.

32. A phenol-formaldehyde resole resin according to claim 30 having a free formaldehyde content at least as low as 9.8 percent by weight of the liquid resin.

33. A phenol-formaldehyde resole resin according to claim 31 wherein the mole ratio of formaldehyde to phenol is from 2.5:1 to 5.0:1.

34. A phenol-formaldehyde resole resin according to claim 33 wherein the mole ratio of formaldehyde to phenol is from 3.0:1 to 4.5:1.

35. A phenol-formaldehyde resole resin according to claim 34 wherein the mole ratio of formaldehyde to phenol is from 3.2:1 to 4.1:1.

36. A phenol-formaldehyde resole resin according to claim 32 having a free formaldehyde content less than 9.8 percent by weight of the liquid resin.

37. A phenol-formaldehyde resole resin according to claim 32 having a free phenol content no more than 0.40 percent by weight of the liquid resin.

38. A phenol-formaldehyde resole resin according to claim 37 having a free phenol content no more than 0.30 percent by weight of the liquid resin.

39. A phenol-formaldehyde resole resin according to claim 38 having a free phenol content between about 0.15 and 0.30 percent by weight of the liquid resin.

40. A process for preparing a phenolic binder for mineral fibers, the process comprising reacting three components: (1) at least one hydroxy-functional aromatic compound, (2) at least one reactive aldehyde, and (3) at least one basic polymerization catalyst; the process including
   a) preparing a water-soluble resin by:
      1) preparing an initial aqueous mixture including at least one hydroxy-functional aromatic compound and a second component selected from the group comprising (1) at least one reactive aldehyde and (2) at least one basic polymerization catalyst;
      2) feeding the third component to the initial aqueous mixture while the temperature of the aqueous mixture is maintained from about 50° C. to about 75° C.; the mole ratio of total catalyst to hydroxy-functional aromatic compound being at least 17 moles catalyst per 100 moles hydroxy-functional aromatic compound;
      3) maintaining the temperature of the aqueous mixture between in a range from about 50° C. to about 75° C. until a predetermined endpoint is achieved; and
      4) cooling the aqueous mixture;
   b) subsequently completing preparation of the binder by adding a catalyst for curing the resole resin.

41. A process according to claim 40 wherein completing preparation of the binder further includes adding a mineral oil lubricant and an organo-silane adhesion promoter to the aqueous mixture including the resole resin.

42. A process according to claim 41 further comprising preparing a premix by combining the water-soluble resin with at least one nitrogenous reagent for scavenging residual monomer, the nitrogenous reagent being selected from urea and ammonia.

43. A process according to claim 40 further comprising acidifying the aqueous mixture.

44. A binder for mineral fibers prepared according any of claims 40–43.

45. A binder for mineral fibers comprising
   (a) a water-soluble phenol-formaldehyde resole resin having:
      (1) a mole ratio of formaldehyde to phenol is from 2.0:1 to 5.0:1;
      (2) a pH from 5 to 9;
      (3) sufficient water solubility so that it can be diluted with water to a ratio of 20:1 at neutral pH after at least three weeks storage at a temperature of about 13° C.;
      (4) a free phenol content no more than 0.50 percent by weight of the liquid resin; and
   (b) a catalyst for curing the resole resin.

46. A binder according to claim 45 Wherein the mole ratio of formaldehyde to phenol is from 2.5:1 to 5.0:1.

47. A binder according to claim 46 wherein the mole ratio of formaldehyde to phenol is from 3.0:1 to 4.5:1.

48. A binder according to claim 47 wherein the mole ratio of formaldehyde to phenol is from 3.2:1 to 4.1:1.

49. A binder according to claim 45 having a free formaldehyde content less than 9.8 percent by weight of the liquid resin.

50. A binder according to claim 45 having a free phenol content no more than 0.40 percent by weight of the liquid resin.

51. A binder according to claim 50 having a free phenol content no more than 0.35 percent by weight of the liquid resin.

52. A binder according to claim 51 having a free phenol content between about 0.15 and 0.35 percent by weight of the liquid resin.

53. A process for preparing a mineral fiber mat product, the process comprising:
   a) preparing a phenolic binder for mineral fibers by a process comprising
      1) preparing a water-soluble resin by a process comprising reacting three components: (1) at least one hydroxy-functional aromatic compound, (2) at least one reactive aldehyde, and (3) at least one basic polymerization catalyst; the process including:
         A) preparing an initial aqueous mixture including at least one hydroxy-functional aromatic compound and a second component selected from the group comprising (1) at least one reactive aldehyde and (2) at least one basic polymerization catalyst;
         B) feeding a third component to the initial aqueous mixture while the temperature of the aqueous mixture is maintained from about 50° C. to about 75° C.; the mole ratio of total catalyst to hydroxy-functional aromatic compound at least 17 moles catalyst per 100 moles hydroxy-functional aromatic compound;
         C) maintaining the temperature of the aqueous mixture between in a range from about 50° C. to about 75° C. until a predetermined endpoint is achieved;
         D) cooling the aqueous mixture; and
         E) neutralizing the aqueous mixture to a pH between 5 and 9;
      2) subsequently completing preparation of the binder by adding a catalyst for curing the resin;
   b) applying the binder to a mineral fiber mat; and
   c) curing the binder comprising the resin and the cure catalyst.

54. A mineral fiber mat product prepared according to the process of claim 53.

55. A process according to claim 53 wherein the amount of phenol measured in the stack effluent gases during application and cure of the binder is reduced by at least 20 percent compared with a mineral fiber mat prepared by the same process, except that the resin is prepared using a mole ratio of total catalyst to hydroxy-functional aromatic compound less than 15 moles catalyst per 100 moles hydroxy-functional aromatic compound.

56. A process according to claim 53 wherein the amount of formaldehyde measured in the stack effluent gases during application and cure of the binder is reduced by at least 20 percent compared with a mineral fiber mat prepared by the same process, except that the resin is prepared using a mole ratio of total catalyst to hydroxy-functional aromatic compound less than 15 moles catalyst per 100 moles hydroxy-functional aromatic compound.

57. A process according to claim 55 wherein the amount of phenol measured in the stack effluent gases during application and cure of the binder is reduced by at least 50 percent.

58. A process according to claim 56 wherein the amount of formaldehyde measured in the stack effluent gases during application and cure of the binder is reduced by at least 50 percent.

59. A process according to claim 55 wherein mineral fiber mat has a density less than 40 kg/m$^3$.

60. A process according to claim 56 wherein mineral fiber mat has a density less than 40 kg/m$^3$.

61. A process according to claim 55 wherein the mineral fiber mat has a density of about 8 kg/m$^3$.

62. A process according to claim 53 wherein the mineral fiber mat has a L.O.I. of from 4 to 6 percent by weight.

* * * * *